US011262521B1

(12) United States Patent
Kachmar

(10) Patent No.: US 11,262,521 B1
(45) Date of Patent: Mar. 1, 2022

(54) FIBER OPTIC CABLE ASSEMBLY FOR INSTALLATION ON A POWERLINE CONDUCTOR

(71) Applicant: Facebook, Inc., Menlo Park, CA (US)

(72) Inventor: Wayne Michael Kachmar, North Bennington, VT (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 17/078,833

(22) Filed: Oct. 23, 2020

Related U.S. Application Data

(60) Provisional application No. 63/045,398, filed on Jun. 29, 2020, provisional application No. 62/941,615, filed on Nov. 27, 2019.

(51) Int. Cl.
*G02B 6/44* (2006.01)
*H02G 1/02* (2006.01)

(52) U.S. Cl.
CPC ......... *G02B 6/4483* (2013.01); *G02B 6/4486* (2013.01); *H02G 1/02* (2013.01)

(58) Field of Classification Search
CPC .................................................. G02B 6/4483
See application file for complete search history.

(56) References Cited

U.S. PATENT DOCUMENTS

| | | | |
|---|---|---|---|
| 4,833,871 A | 5/1989 | Ogawa et al. | |
| 5,727,373 A | 3/1998 | Appleford et al. | |
| 6,000,209 A | 12/1999 | Ito et al. | |
| 6,813,421 B2 | 11/2004 | Lail et al. | |
| 6,813,422 B1 | 11/2004 | Krishnamurthy et al. | |
| 8,831,394 B2 | 9/2014 | Kimbrell et al. | |
| 8,919,092 B2 | 12/2014 | Figenschou et al. | |
| 9,051,153 B2 | 6/2015 | Lichoulas et al. | |
| 2003/0006332 A1 | 1/2003 | Appleby et al. | |
| 2004/0071416 A1* | 4/2004 | Militaru | G02B 6/4419 385/113 |

(Continued)

FOREIGN PATENT DOCUMENTS

| | | |
|---|---|---|
| DE | 19820037 A1 | 11/1999 |
| FR | 2890756 A1 | 3/2007 |
| JP | 2000292666 A | 10/2000 |

OTHER PUBLICATIONS

Fiberline, "Swellcoat™ Blocker", Oil & Gas, Fiber-Line Waterblocking Yarns, as accessed on Oct. 27, 2020, 1 page.

(Continued)

*Primary Examiner* — Chris H Chu
(74) *Attorney, Agent, or Firm* — FisherBroyles, LLP

(57) ABSTRACT

The disclosed fiber optic cable may include (1) a plurality of optical fibers, (2) a core tube surrounding the plurality of optical fibers, (3) a thixotropic gel filling an interstitial space among the optical fibers within the core tube, (4) an intermediate layer surrounding the core tube, where the intermediate layer includes a plurality of linear elements contrahelically wrapped about the core tube, and (5) an outer layer surrounding the intermediate layer, where the outer layer includes a combination of a moisture-cure cross-linked material and an activation catalyst, where the outer layer is formed by masticating and extruding the combination onto the intermediate layer. Various other cables, assemblies, and methods are also disclosed.

20 Claims, 4 Drawing Sheets

(56) References Cited

U.S. PATENT DOCUMENTS

| | | | |
|---|---|---|---|
| 2004/0247271 A1* | 12/2004 | Skovgaard | G02B 6/02366 |
| | | | 385/125 |
| 2008/0101753 A1 | 5/2008 | Suzuki et al. | |
| 2008/0130010 A1 | 6/2008 | Williams | |
| 2012/0211447 A1 | 8/2012 | Anderson et al. | |
| 2012/0308189 A1 | 12/2012 | Kimbrell et al. | |
| 2016/0011366 A1* | 1/2016 | Tsukamoto | G02B 1/046 |
| | | | 385/126 |
| 2016/0215130 A1* | 7/2016 | Esseghir | G02B 6/4432 |
| 2016/0236857 A1 | 8/2016 | Adams et al. | |
| 2017/0176703 A1 | 6/2017 | Baker et al. | |
| 2018/0074214 A1 | 3/2018 | Magne et al. | |

OTHER PUBLICATIONS

Wikipedia, "Carbon Black", URL: https://en.wikipedia.org/w/index.php?title=Carbon_black&oldid=985037981, as accessed on Oct. 23, 2020, 6 pages.

Wikipedia, "Cross-linked polyethylene", URL: https://en.wikipedia.org/w/index.php?title=Cross-linked_polyethylene&oldid=979194209, as accessed on Sep. 19, 2020, 15 pages.

Wikipedia, "Polyethylene", URL: https://en.wikipedia.org/w/index.php?title=Polyethylene&oldid=983809595, as accessed on Oct. 16, 2020, 17 pages.

Wikipedia, "Kevlar" URL: https://en.wikipedia.org/w/index.php?title=Kevlar&oldid=979269720, as accessed on Sep. 19, 2020, 11 pages.

AFL, "Lightweight Retro-fit Fibre Optic Cable," AccessWrap, May 9, 2012, 1 Page.

"Fiber Optic Cable," SkyWrap, AFL, Jun. 25, 2014, pp. 59-60.

"Frequently Asked Questions," AFL, SkyWrap Information, Jul. 23, 2013, pp. 1-2.

International Search Report and Written Opinion for International Application No. PCT/US2020/032046, dated Jul. 22, 2020, 9 pages.

International Search Report and Written Opinion for International Application No. PCT/US2020/032103, dated Aug. 25, 2020, 10 Pages.

* cited by examiner

FIBER OPTIC CABLE ASSEMBLY FOR INSTALLATION ON A POWERLINE CONDUCTOR

CROSS REFERENCE TO RELATED APPLICATIONS

This application claims the benefit of U.S. Provisional Application No. 62/941,615, filed 27 Nov. 2019, and U.S. Provisional Application No. 63/045,398, filed 29 Jun. 2020, the disclosures of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
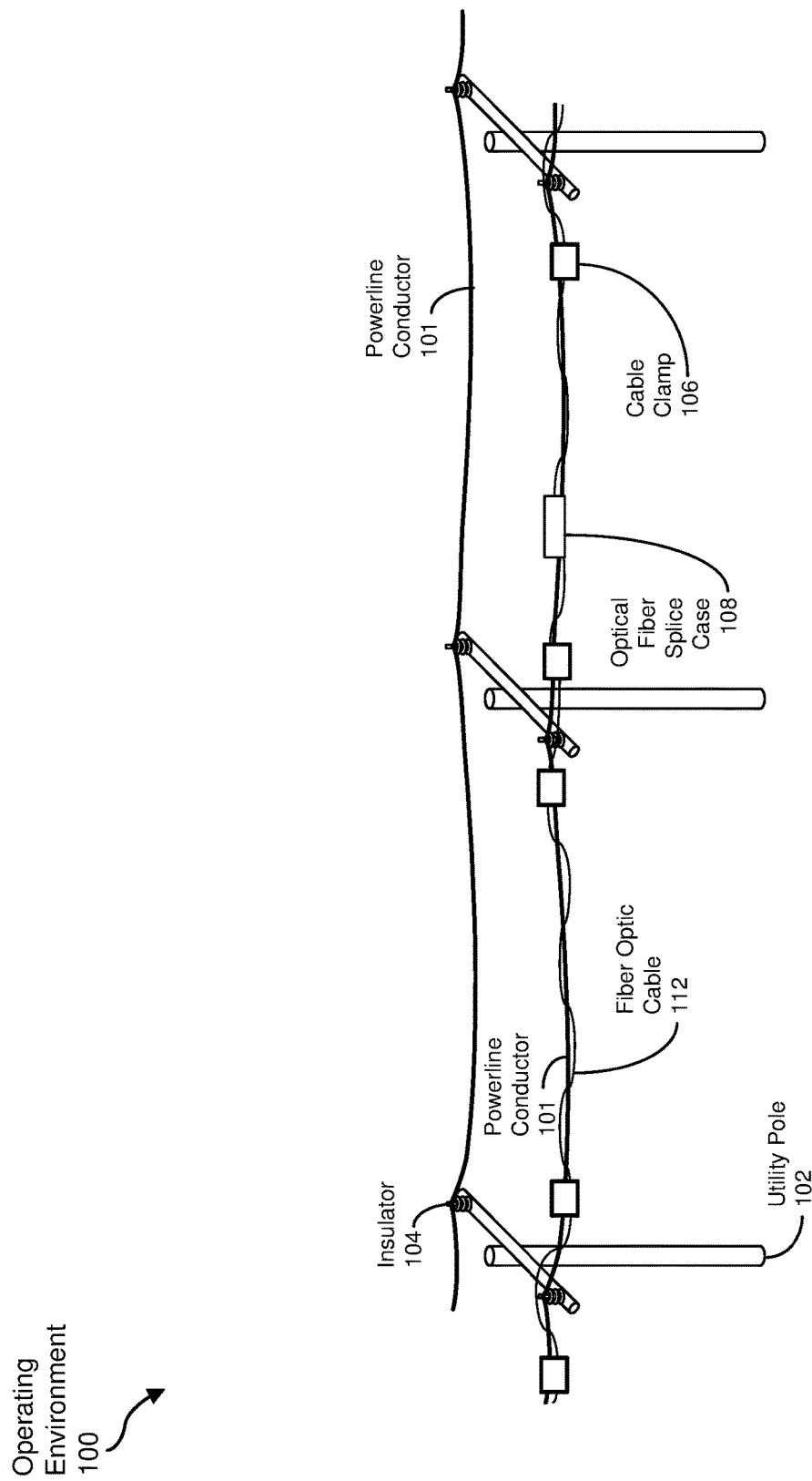
FIG. 1 is a graphical representation of an exemplary operating environment, including a powerline conductor, in which various exemplary embodiments may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Robotic devices may be employed to install fiber optic cable onto preexisting power infrastructure, such as powerline conductors for electrical power transmission and distribution lines, by way of helically wrapping the fiber optic cable about the powerline conductor. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline conductor (e.g., between towers or poles) while a rotation subsystem of the device helically wraps the fiber optic cable about the conductor.

Traditionally, the robotic device carries the fiber optic cable on a spool from which the cable is paid out as the cable is wrapped about the powerline conductor. Further, to facilitate the wrapping, the spool is typically mounted on a mechanical arm that rotates about the powerline conductor. Moreover, a counterweight is sometimes employed to balance the weight of the spool, thus contributing to the overall weight of the robotic system.

The present disclosure is generally directed to a fiber optic cable, as well as a method of manufacturing such a cable, that may facilitate the installation of long continuous stretches (e.g., approximately 1 kilometer (km)) onto a powerline conductor by a relatively lightweight robotic device that may be employed on a variety of powerline conductor types. In some examples, the fiber optic cable may be deployed on a spool carried by the robotic device from which the fiber optic cable is unrolled as the cable is wound about the conductor. In other examples, the cable may be deployed as a "spool-free" fiber optic cable configuration or bundle for installation. In such examples, the cable may be wound in a circular or non-circular shape for placement in a tub or other container to be carried by the robotic device. Further, in some embodiments, a shape-maintaining substance (e.g., paraffin) may be applied to the cable such that the cable configuration maintains a particular shape prior to being installed onto the powerline conductor. In some examples, a spool-free arrangement may facilitate a center-pull bobbin payout, where the fiber optic cable is paid out first from an interior region of the arrangement. As will be explained in greater detail below, embodiments of the fiber optic cable, as disclosed herein, may possess a low mass per unit length, high tensile strength, and/or long operational life.

Features from any of the embodiments described herein may be used in combination with one another in accordance with the general principles described herein. These and other embodiments, features, and advantages will be more fully understood upon reading the following detailed description in conjunction with the accompanying appendices.

Below, a brief description of an exemplary operating environment in which an exemplary robotic system for installing fiber optic cable may operate is provided in connection with FIG. 1. An exemplary robotic system for installing fiber optic cable is briefly discussed in conjunction with FIG. 2. Thereafter, embodiments of an exemplary fiber optic cable for installation onto a powerline conductor are disclosed in conjunction with FIG. 3, while exemplary methods of manufacturing such a cable are explored in connection with FIG. 4.

FIG. 1 is a graphical representation of an exemplary operating environment 100 in which various embodiments disclosed herein may be utilized. As depicted in the example of FIG. 1, operating environment 100 may include an electrical power transmission or distribution system having a plurality of utility poles 102 carrying multiple powerline conductors 101. Examples of powerline conductors 101 may include stranded cables, but powerline conductors 101 are not restricted to such embodiments. While any number of powerline conductors 101 may be carried via utility poles 102, two powerline conductors 101 are illustrated in FIG. 1 for visual simplicity. In some examples, powerline conductors 101 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 101 may be included and covered in various embodiments of operating environment 100 discussed below. Additionally, powerline conductors 101 may include one or more phase conductors, ground wires, static wires, or other conductors supported by utility poles 102, towers, or the like.

Also shown in FIG. 1 is a fiber optic cable 112 aligned with, and mechanically coupled to, powerline conductor 101. In some embodiments, fiber optic cable 112 may be helically wrapped about powerline conductor 101, such as by way of a human-powered or electrically powered robotic device. However, other physical relationships between powerline conductor 101 and fiber optic cable 112 are also possible. While only one fiber optic cable 112 is depicted in FIG. 1, multiple powerline conductors 101 employing the same utility poles 102 may each have a corresponding fiber optic cable 112 attached or otherwise coupled thereto. As depicted in FIG. 1, fiber optic cable 112 may be secured to powerline conductor 101 via one or more cable clamps 106. In some examples, fiber optic cable 112 may follow a powerline conductor 101 associated with a particular phase of the power being transmitted, or fiber optic cable 112 may alternate between two or three different phases. Moreover, each fiber optic cable 112 may carry one or more optical fibers for facilitating communication within operating environment 100.

Additionally, FIG. 1 illustrates an optical fiber splice case 108 that, in some embodiments, splices together corresponding ends of optical fibers of fiber optic cable 112. For example, relatively long stretches (e.g., multiple-kilometer spans) of fiber optic cable 112 that may be coupled to powerline conductor 101 may be mechanically coupled together, thermally fused together, or otherwise coupled in optical fiber splice case 108, which may include optical couplers, amplifiers, and/or other components to facilitate transmission of optical data signals from one span of fiber optic cable 112 to the next. Additionally, in some embodiments, optical fiber splice case 108 may include wireless access points and other networking components (e.g., for communication with Internet of Things (IoT) devices, smart grid sensors (e.g., voltage sensors, current sensors, and the like), and user access networks). Moreover, optical fiber splice case 108 may include optical, electromagnetic, and other types of sensors to measure powerline conditions; environmental sensors for measuring temperature, humidity, and so on; video cameras for surveillance; and the like. To power such components, optical fiber splice case 108 may also include solar cells and/or batteries. In some examples, such as that shown in FIG. 1, optical fiber splice case 108 may be attached to, or positioned on or near, powerline conductor 101, as opposed to being mounted on a lower portion of utility pole 102, thus potentially eliminating the use of a phase-to-ground transition that otherwise may be coupled with each length of fiber optic cable 112 to provide electrical isolation from powerline conductor 101.

Figure 2:
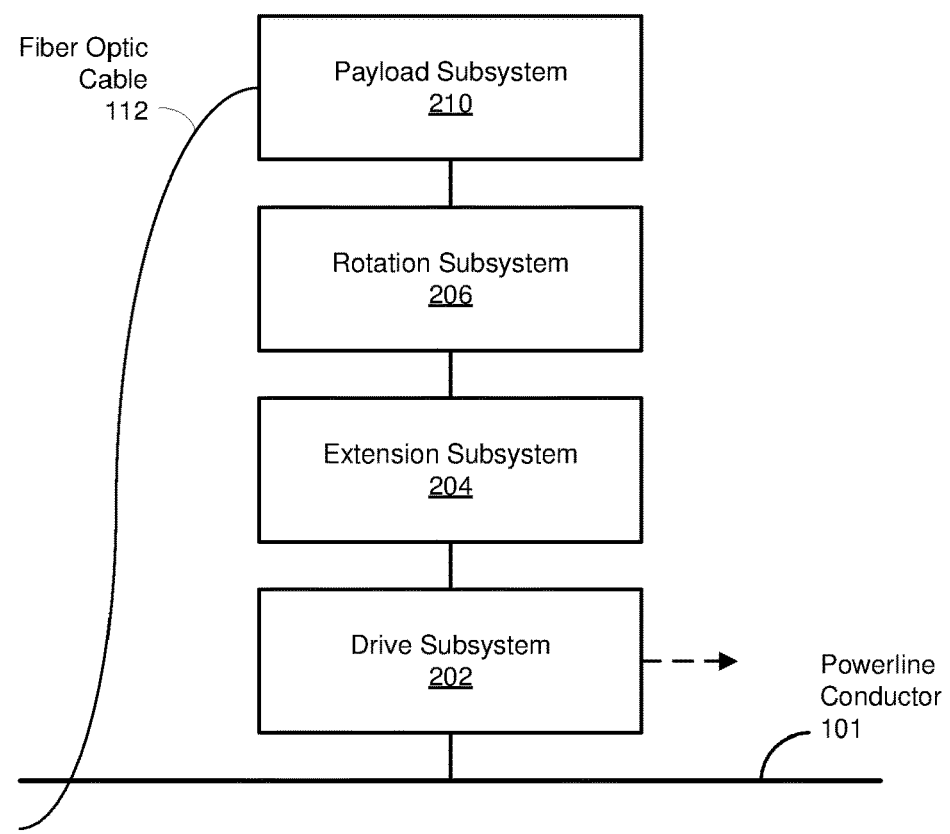
FIG. 2 is a block diagram of an exemplary robotic system that may install a segment of fiber optic cable onto a powerline conductor.

FIG. 2 is a block diagram of an exemplary robotic system 200 for installing fiber optic cable (e.g., fiber optic cable 112) onto a powerline conductor (e.g., powerline conductor 101). As depicted in FIG. 2, robotic system 200 may include a drive subsystem 202, an extension subsystem 204, a rotation subsystem 206, and/or a payload subsystem 210. In some embodiments, FIG. 2 provides a general representation of how subsystems 202-210 are mechanically coupled to each other, although other examples may possess alternative connection arrangements. In some embodiments, drive subsystem 202 may translate along powerline conductor 101. Also, in some examples, extension subsystem 204 may mechanically couple rotation subsystem 206 to drive subsystem 202 and selectively extend rotation subsystem 206, along with payload subsystem 210, away from drive subsystem 202 and/or powerline conductor 101 to avoid obstacles (e.g., insulators 104) along powerline conductor 101. Rotation subsystem 206, in some examples, may rotate payload subsystem 210, which may in turn carry a segment of fiber optic cable 112, about powerline conductor 101 while drive subsystem 202 translates along powerline conductor 101 such that the segment of fiber optic cable 112 is wrapped helically about powerline conductor 101.

Moreover, in some embodiments, rotation subsystem 206 may include one or more stabilization components (e.g., one or more thrusters) that may help attain or maintain a desired position of rotation subsystem 206 and/or other portions of robotic system 200 relative to powerline conductor 101, such as directly above powerline conductor 101. Further, in some examples, the stabilization components may be employed at least during times when extension subsystem 204 is extending rotation subsystem 206 (and, consequently, payload subsystem 210) away from powerline conductor 101.

Embodiments of an exemplary fiber optic cable (e.g., fiber optic cable 112), as described below, may be installed onto a powerline conductor (e.g., powerline conductor 101), such as by way of robotic system 200. Such a cable may be configured to be relatively light and thin to facilitate the installation (e.g., via helical wrapping) of long segments of the cable onto the conductor, thus reducing the number of optical splices required to join those segments end-to-end, which may improve installation efficiency as well as communication quality. Additionally, in some examples, the fiber optic cables, due to their construction as described more fully below, may possess a significantly high bending modulus, thus reducing the probability of damaging the optical fibers due to any mechanical operations performed on the cable, including but not limited to forming a wound (e.g., spool-free) mass of the cable prior to installation, helically wrapping the cable onto a powerline conductor during installation, clamping the cable onto the conductor, and splicing ends of optical fibers on adjacent segments of the cable after installation. Moreover, in some embodiments, an external jacket and/or braid may surround the cable to help protect the cable against impairment due to challenging environmental conditions, as well as against damage due to animal and human activity. Also, in some examples, the external portion of the cable may be configured to adhere to a wax or similar material employed to form a spool-free mass for installation purposes. Further, an external surface of the cable may be coated with an adhesive that facilitates bonding of the cable to the powerline conductor on initiation from heating, moisture, or ultraviolet (UV) exposure presented by the environment after being helically wrapped about the conductor, which may help prevent unraveling of the fiber optic cable from the conductor in the event the fiber optic cable is severed.

Figure 3:
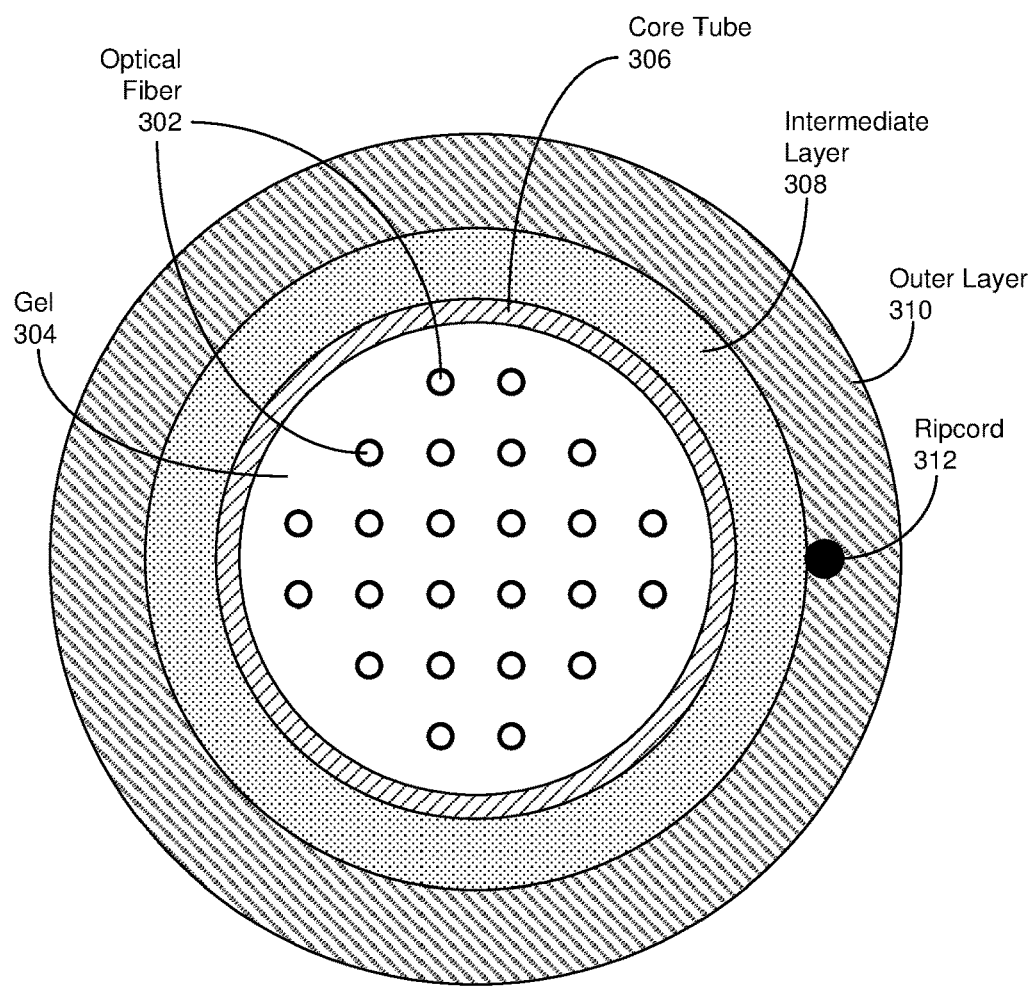
FIG. 3 is a cross-sectional view of an exemplary fiber optic cable (e.g., installable by the robotic system of FIG. 2).

FIG. 3 is a cross-sectional view of an exemplary fiber optic cable 300 (e.g., serving as fiber optic cable 112 of FIG. 1, which may be installable by robotic system 200 of FIG. 2). Fiber optic cable 300 may include a core tube 306 (e.g., a core plastic tube) within which a number (e.g., 24) of optical fibers 302 (e.g., individually coated single-mode optical fibers with standard optical cable colors) reside. Optical fibers 302, in some examples, may be compliant with International Telecommunication Union standard ITU-T G.657.A1 (having a minimum bend radius of approximately 10 millimeters (mm)) or ITU-T G.657.A2 (with a minimum bend radius of approximately 7.5 mm). While 24 optical fibers 302 are depicted in FIG. 3, other numbers of optical fibers 302 (e.g., 12, 16, 36, and so on)

may be employed in other examples. In some embodiments, optical fibers 302 may be 200-micron diameter glass fibers, although other types of optical fibers 302 are also possible. Also, in some examples, multi-mode optical fibers may be employed as optical fibers 302 in lieu of single-mode fibers. In yet other embodiments, optical fibers 302 may form a connected ribbon of optical fibers, as opposed to a plurality of "loose" optical fibers.

Core tube 306 may also include a slightly larger additional tube to constitute a dual-layer tube, thus protecting the inner core tube to extend its lifetime. In some examples, core tube 306 may be approximately 2.45 mm (+/−0.15 mm) in diameter. Moreover, in some examples, the outer tube layer of core tube 306 may provide a basic tensile strength, as well as substantial radial hoop strength, to the dual-layer structure, which in part aids in resisting forces imparted on the structure by additional layers of the overall fiber optic cable 300. Either or both tubes of core tube 306 may manufactured from a hydrophobic polymer (e.g., polypropylene) in some embodiments. In some examples, the inner core tube may be blown into the outer core tube to provide core tube 306.

In some embodiments, the interstitial space within the core tube 306 not occupied by optical fibers 302 may be filled with a gel 304 (e.g., a water blocking gel) to displace most or all of the air surrounding optical fibers 302 within core tube 306. In some examples, gel 304 may be thixotropic, in which the gel may temporarily become less viscous in response to some types of physical stress, which may serve to protect optical fibers 302 from vibration, moisture, and the like. Moreover, in some embodiments, the inner tube of core tube 306 may include an engineering resin that substantially blocks gel 304 from adversely affecting the outer (e.g., thicker) tube layer of core tube 306, as some polymers employed in optical fiber tube manufacturing may be sensitive to oils in gel 304, and thus may swell due to such exposure over time. In some examples, gel 304 may increase the hoop strength applicable to core tube 306, thus resisting deformation that may otherwise occur as a result of additional layers (e.g., intermedia layer 308) being applied onto core tube 306. In other embodiments, a highly swellable polymer may be employed instead of gel 304 to fill the interstitial space within the core tube 306 not occupied by optical fibers 302 (e.g., to limit or block the entrance of water within core tube 306).

Surrounding core tube 306 may be an intermediate layer 308 (e.g., a strength layer) that may impart longitudinal (e.g., tensile) strength to the overall fiber optic cable 300 (e.g., to withstand stretching of powerline conductor 101 and similar forces). In some embodiments, intermediate layer 308 may include a plurality of linear elements, strands, or members that may be helically braided or wrapped about core tube 306. The elements, threads, or members may be formed using aramid fibers or yarn, fiberglass yarn, coated fiberglass yarn, ceramic fibers, oriented polymer fibers, yielded polyester, rigid glass-reinforced plastic (GRP) rods, and so on, and may be applied longitudinally about core tube 306, such as by way of helical wrapping or dual-helical wrapping (e.g., contra-helically in opposing senses) to more fully enclose core tube 306. In a particular example, a plurality (e.g., 16 separate threads or ends) of aramid fibers (e.g., 400-denier aramid) may be braided about core tube 306 (e.g., in a 1×1 braid configuration) at a particular pitch (e.g., 6 pics per inch). (As generally employed herein, a denier of a thread, fiber, or other linear element is a weight of a continuous 1-km length of the element, thus providing a measure of a weight per unit length for that element.) Further, in some embodiments, use of a maypole braider in braiding the strength members may substantially lock the strength members around core tube 306 to prevent migration of the members to one side of core tube 306 and provide a high-tensile loading capacity. In some example, the design of intermediate layer 308 (e.g., in view of the tension applied to the strength members during wrapping or braiding about core tube 306, the number of pics per inch employed, and/or the like) may facilitate deformation of a circularly coiled bundle of fiber optic cable 300 into a non-circular shape. Further, in some embodiments, a relationship between a braid ratio of intermediate layer 308 to the size of the bundle of fiber optic cable 300 may facilitate retraction of fiber optic cable 300 from an inner region of the non-circular bundle with minimal twist and negligible deformation of the layer structure of fiber optic cable 300.

Further, in some embodiments, core tube 306 (e.g., in combination with gel 304) may possess enough hoop strength to allow intermediate layer 308 to maintain a desirable level of tensile performance for fiber optic cable 300. For example, in such cases, intermediate layer 308 may facilitate a maximum desired tensile load and subsequent recovery of the length of fiber optic cable 300 after reduction or removal of the tensile load (e.g., that may occur after installation of fiber optic cable 300 onto powerline conductor 101).

In some examples, intermediate layer 308 may be formed using threads or fibers impregnated with a highly swellable polymer to preclude or limit water ingress underneath an outer layer 310 or jacket (described below) to be applied over intermediate layer 308. Additionally or alternatively, a group of parallel water-swellable fibers (e.g., polyester or nylon infused with a highly swellable polymer) may be laid underneath and/or atop the braided members of intermediate layer 308 (e.g., aligned parallel to each other). Consequently, should outer layer 310 be breached (e.g., due to abrasion, lightning, animal intrusion, or the like), the swellable polymer may exude a gel to stop or contain the flow of water or other liquid through the breach.

Atop intermediate layer 308, outer layer 310 or jacket may be formed to protect the underlying portions of fiber optic cable 300 from environmental elements (e.g., rain, snow, pollution, fungus, ultraviolet (UV) radiation, and so on), adverse electrical properties (lightning and other high voltage conditions), and/or animal-caused damage. In some embodiments, outer layer 310 may include a composite material of a moisture-cure cross-linked material (e.g., moisture-cure cross-linked high-density polyethylene (HDPE)). (In general, a type of polyethylene may be assigned into one of a number of categories ranging from low-density to ultra-high-density polyethylene according to the density of the material.) In addition, an activation catalyst (e.g., at a 5 percent mixture) may be added prior to processing (e.g., extrusion) for activation of the moisture cure process. Further, in some embodiments, the cross-linked material may include carbon black (e.g., a type of carbon black possessing desirable high-voltage behavior, such as PE940) and possibly one or more antioxidants. In some examples, the carbon black may possess a particle size of approximately 20 nanometers (nm), as what may be employed for enhanced UV radiation protection. In some embodiments, the resulting combination of materials for outer layer 310 may also resist melting under extended high-temperature conditions (e.g., 90 degrees Celsius (° C.)) and short-duration extreme over-temperature events (e.g., 150° C., possibly caused by a lightning strike or other extreme incident). Such materials may also be employed to resist damage from extremely low temperatures (e.g., −30° C.). Other possible substances that may be added to the combination for enhanced high-voltage and erosion performance include titanium oxide and zinc oxide.

In addition, in some embodiments, a ripcord 312 (e.g., a 400-denier ripcord) may be applied underneath outer layer 310, being positioned (e.g., linearly) along intermediate layer 308 to facilitate opening of outer layer 310 from an end of fiber optic cable 300 (e.g., by pulling ripcord 312 approximately perpendicular to the assembly of fiber optic cable 300).

Also, in some examples, the pre-extrusion mixture that becomes outer layer 310 may include a chemical nontoxic, nonnutritive animal repellant (e.g., C-2232, capsaicin, denatonium benzoate, methyl anthranilate, and/or the like) that is useful in preventing animal predation, which may be of particular concern with a cable assembly of a relatively small diameter. In some embodiments, the repellant may be contained in pellets of low-density polyethylene (LDPE) or ethylene vinyl acetate (EVA). These pellets, in some cases, may then be combined with the moisture-cure cross-linked material prior to an extrusion process, which may cause a melting and mastication of the pellets with the cross-linked material to create a uniform compound during the extrusion and distribution of the combined material onto intermediate layer 308. In some examples, a semi-pressure toolset may be employed for performing the extrusion as a compromise between true pressure extrusion and annular extrusion to achieve a tight fit and minimize jacket (outer layer 310) shrinkage. In some examples, outer layer 310 may possess a nominal wall thickness of 0.6 mm (+/−0.1 mm).

In some embodiments, curing and/or cross-linking of the material for outer layer 310 after its application onto intermediate layer 308 may occur with the passage of some period of time. In other examples, curing of the cross-linked material may be accelerated by placing the cable assembly in hot water for some predetermined period of time (e.g., 12 hours to 48 hours). Further, in embodiments in which an animal repellant has been added to the cross-linked material, the effectiveness of the repellant may begin at some period of time after activation during the curing process (e.g., one month). In an embodiment, the completed cable assembly may possess a final diameter of 0.154 inches (3.91 mm).

In some embodiments, the overall design of fiber optic cable 300, as described herein, may allow installation of fiber optic cable 300 (e.g., helically about powerline conductor 101) with sufficient tension to reduce or eliminate gaps between fiber optic cable 300 and powerline conductor 101 while preventing relaxation or lengthening of fiber optic cable 300 after installation that may otherwise occur due to material yield, cable relaxation, or repositioning of any elements (e.g., elements of core tube 306 or intermediate layer 308) of fiber optic cable 300 in response to intermittent tensile strain events. In some examples, fiber optic cable 300 may withstand a tensile load of 150 pounds with less than 0.3% strain on optical fibers 302. In some embodiments, fiber optic cable 300 may possess a cable weight of less than or equal to 13 grams/meter and an overall diameter of less than or equal to 4 mm.

Figure 4:
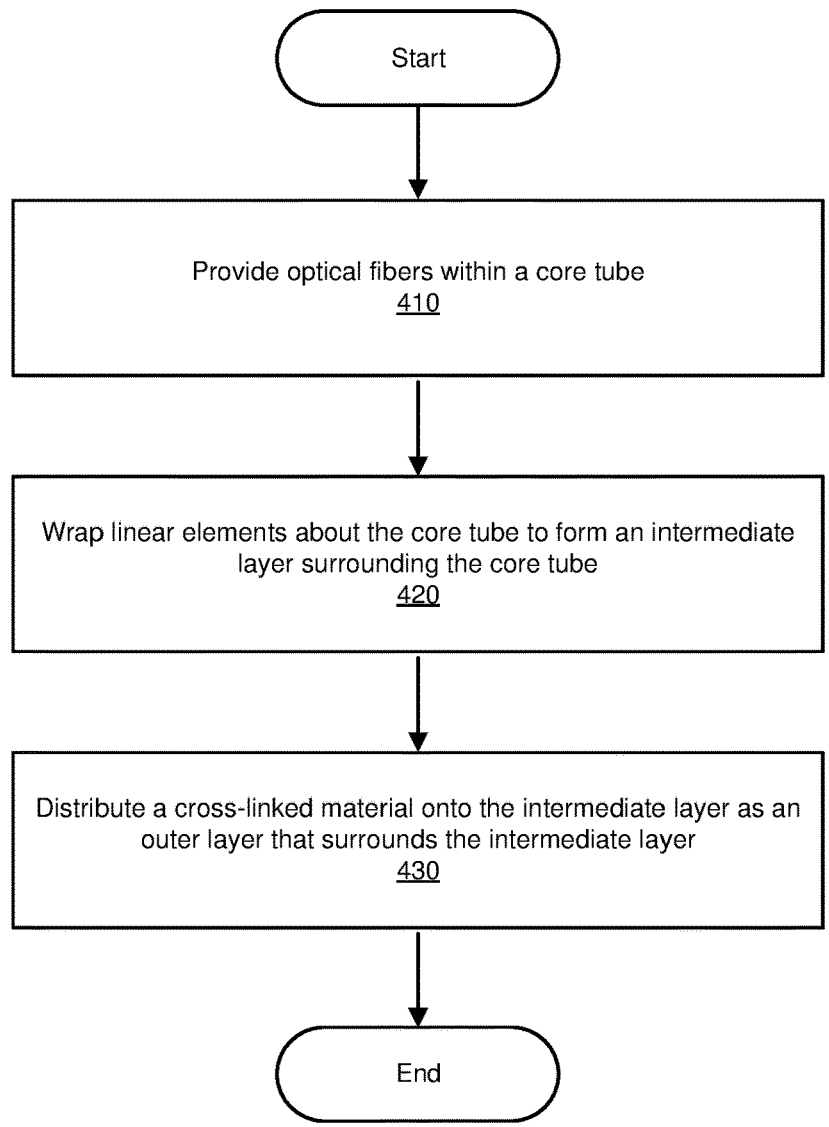
FIG. 4 is a flow diagram of an exemplary method for constructing a fiber optic cable (e.g., the fiber optic cable of FIG. 3).

FIG. 4 is a flow diagram of an exemplary method 400 for constructing a fiber optic cable (e.g., fiber optic cable 300 of FIG. 3), as outlined above. In method 400, at step 410. a core tube (e.g., core tube 306) carrying a plurality of optical fibers (e.g., optical fibers 302) may be provided. In some examples, filling the interstitial space of the core tube not occupied by the optical fibers may be a gel (e.g., gel 304, such as a thixotropic gel). Further, in some embodiments, the core tube may be a dual-layer tube that provides greater strength and protection for the optical fibers located within.

At step 420, a plurality of linear elements, such as fibers or threads (e.g., aramid yarn, fiberglass yarn, ceramic fibers, or the like) may be wrapped (e.g., helically, such as to form a braid) about the core tube to form an intermediate layer (e.g., intermediate layer 308) surrounding the core tube. In some embodiments, the linear elements may be impregnated with a swellable polymer. In other examples, a thixotropic gel, silicone grease, or other water-blocking substance may be infused into the linear elements. In other examples, a plurality of parallel water-swellable fibers may be provided as a part of the intermediate layer underneath or atop the linear elements.

At step 430, a cross-linked material (e.g., moisture-cure cross-linked HDPE) may be distributed (e.g., extruded) onto the intermediate layer as an outer layer (e.g., outer layer 310) or jacket that surrounds the intermediate layer. In some embodiments, the cross-linked material may be combined with one or more additional materials, such as a catalyst for activation of the moisture cure process, carbon black for protection against high-voltage conditions, an antioxidant to maintain the structural integrity of the outer layer, a chemical animal repellant, and/or the like, which may form a combination when melted or masticated together as part of the distribution process. Further, in some examples, a ripcord (e.g., ripcord 312 of FIG. 3) may be placed atop (e.g., alongside) the intermediate layer prior to or during distribution of the outer layer onto the intermediate layer to facilitate removal of a portion of the outer layer, such as prior to coupling a segment of the fiber optic cable to another such segment.

After the manufacturing of fiber optic cable 300, as described above, the resulting assembly may be further processed to prepare the assembly for installation (e.g., via helical wrapping) onto a powerline conductor (e.g., powerline conductor 101 of FIG. 1) by a robotic device (e.g., robotic device 200 of FIG. 2). In some embodiments, a substance (e.g., paraffin) may be applied to the fiber optic cable 300 (e.g., using an annular die wax applicator) before being wound into a generally circular bundle (e.g., about a reconfigurable manufacturing jig). The jig may then be reconfigured to facilitate reshaping of the bundle into a noncircular shape (e.g., a generally horseshoe shape) that is compatible with a container from which robotic device 200 is configured to withdraw fiber optic cable 300 for installation about powerline conductor 101. Further, in some examples, the reshaped cable assembly may be heated to temporarily reflow the applied substance (e.g., below a maximum operational temperature for the cable assembly) such that the noncircular shape is maintained prior to placement of the cable assembly into the container.

Additional or alternatively, a separate adhesive may be applied to outer layer 310 that bonds fiber optic cable 300 to powerline conductor 101 after being helically wrapped about powerline conductor 101 (e.g., when exposed to ultraviolet (UV) light, heat, moisture, or other aspects of the environment). Such an adhesive may aid in preventing or inhibiting unraveling of fiber optic cable 300 from powerline conductor 101 if fiber optic cable 300 is severed. In some embodiments, this separate adhesive may be applied prior to the paraffin discussed above. In some examples, the paraffin may be removed (e.g., stripped) from fiber optic cable 300 while being installed on powerline conductor while leaving the separate adhesive for attachment of fiber optic cable 300 to powerline conductor 101.

In view of the discussion above in conjunction with FIGS. 1-4, a fiber optic cable assembly may include a core tube (e.g., a dual-layer core) carrying a plurality of optical fibers (e.g., for carrying communication information), an intermediate (strength) layer (e.g., braided over the core) to provide increased tensile strength to the assembly, and an outer layer or jacket for protecting the cable assembly against various environmental conditions. Consequently, in some examples, the resulting fiber optic cable assembly may exhibit a significant amount of resilience during and well after the installation of the assembly about a powerline conductor (e.g., due to a thermal expansion of the conductor due to increased energy load and high ambient temperatures) while possessing a relatively light weight per unit length to facilitate installation of long continuous stretches (e.g., 1 km or more) of the cable assembly onto power distribution systems. Further, such continuous cable assembly segments may result in a relatively low number of optical splices relative to other optical fiber installations, thereby potentially facilitating a faster installation process and enhanced optical signal quality.

EXAMPLE EMBODIMENTS

Example 1: A fiber optic cable may include (1) a plurality of optical fibers, (2) a core tube surrounding the plurality of optical fibers, where the core tube includes a single-layer core or a dual-layer core tube, (3) a thixotropic gel filling an interstitial space among the plurality of optical fibers within the core tube, where the thixotropic gel increases a hoop strength applicable to the core tube, (4) an intermediate layer surrounding the core tube, where the intermediate layer includes a plurality of linear elements contra-helically wrapped about the core tube to provide a predetermined tensile strength to the fiber optic cable without overcoming the hoop strength of the core tube and to manage cable length recovery from a tensile condition of the fiber optic cable, and (4) an outer layer surrounding the intermediate layer, where the outer layer includes a combination of a moisture-cure cross-linked material and an activation catalyst, and where the outer layer is formed by masticating and extruding the combination onto the intermediate layer.

Example 2: The fiber optic cable of Example 1, where the plurality of optical fibers may include a plurality of single-mode optical fibers.

Example 3: The fiber optic cable of Example 1, where the plurality of optical fibers may include a plurality of multi-mode optical fibers.

Example 4: The fiber optic cable of any one of Examples 1, 2, or 3, where an inner tube of the dual-layer core tube may include a resin that prevents an oil of the thixotropic gel from contacting an outer tube of the dual-layer core tube.

Example 5: The fiber optic cable of any one of Examples 1, 2, or 3, where the plurality of linear elements may be impregnated with a swellable polymer.

Example 6: The fiber optic cable of any one of Examples 1, 2, or 3, where the fiber optic cable may further include a plurality of swellable fibers that are aligned parallel to each other and adjacent the plurality of linear elements.

Example 7: The fiber optic cable of Example 6, where the plurality of swellable fibers may be located under the intermediate layer.

Example 8: The fiber optic cable of Example 6, where the plurality of swellable fibers may be located atop the intermediate layer.

Example 9: The fiber optic cable of any one of Examples 1, 2, or 3, where the plurality of linear elements may include a plurality of aramid fibers.

Example 10: The fiber optic cable of any one of Examples 1, 2, or 3, where the plurality of linear elements may include a plurality of oriented polymer fibers.

Example 11: The fiber optic cable of any one of Examples 1, 2, or 3, where the plurality of linear elements may include fiberglass.

Example 12: The fiber optic cable of any one of Examples 1, 2, or 3, where the plurality of linear elements may include a plurality of coated fiberglass yarns.

Example 13: The fiber optic cable of any one of Examples 1, 2, or 3, where the cross-linked material may include moisture-cure high-density polyethylene.

Example 14: The fiber optic cable of any one of Examples 1, 2, or 3, where the outer layer may further include a chemical animal repellant.

Example 15: A method of assembling a fiber optic cable may include (1) providing a plurality of optical fibers and a thixotropic gel within a core tube, where (a) the core tube includes a single-layer core tube or a dual-layer core tube, (b) the thixotropic gel fills an interstitial space among the plurality of optical fibers within the core tube, and (c) the thixotropic gel increases a hoop strength applicable to the core tube, (2) contra-helically wrapping a plurality of linear elements about the core tube to provide a predetermined tensile strength to the fiber optic cable without overcoming the hoop strength of the core tube and to manage cable length recovery from a tensile condition of the fiber optic cable, where the plurality of linear elements form an intermediate layer surrounding the core tube, and (3) masticating and extruding a combination of a moisture-cure cross-linked material and an activation catalyst onto the intermediate layer to form an outer layer that surrounds the intermediate layer.

Example 16: The method of Example 15, where the combination may further include an animal repellant.

Example 17: The method of Example 16, where the combination may further include at least one of low-density polyethylene pellets including the animal repellant or ethylene vinyl acetate pellets including the animal repellant.

Example 18: The method of any one of Examples 15, 16, or 17, where the method may further include curing the combination after extruding the combination onto the intermediate layer.

Example 19: The method of Example 18, where the method may further include (1) applying a wax to the outer layer, (2) winding the fiber optic cable into a circular bundle, (3) reshaping the circular bundle into a noncircular bundle, and (4) heating the noncircular bundle to reflow the wax.

Example 20: A fiber optic cable may include (1) a core tube surrounding a plurality of optical fibers, (2) a thixotropic gel filling an interstitial space among the plurality of optical fibers within the core tube, where the thixotropic gel increases a hoop strength applicable to the core tube, (3) an intermediate layer including a plurality of fibers braided about the core tube to provide a predetermined tensile strength to the fiber optic cable without overcoming the hoop strength of the core tube and to manage cable length recovery from a tensile condition of the fiber optic cable, where the plurality of linear elements are impregnated with a swellable polymer, and (4) an outer layer surrounding the intermediate layer, where the outer layer includes a moisture-cure cross-linked material, an activation catalyst, and a chemical animal repellant that are masticated and extruded onto the intermediate layer.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fiber optic cable comprising:
   a plurality of optical fibers;
   a core tube surrounding the plurality of optical fibers, wherein the core tube comprises a single-layer core or a dual-layer core tube;
   a thixotropic gel filling an interstitial space among the plurality of optical fibers within the core tube, wherein the thixotropic gel increases a hoop strength applicable to the core tube;
   an intermediate layer surrounding the core tube, wherein the intermediate layer comprises a plurality of linear elements contra-helically wrapped about the core tube to provide a predetermined tensile strength to the fiber optic cable without overcoming the hoop strength of the core tube and to manage cable length recovery from a tensile condition of the fiber optic cable; and
   an outer layer surrounding the intermediate layer, wherein the outer layer comprises a combination of a moisture-cure cross-linked material and an activation catalyst, and wherein the outer layer is formed by masticating and extruding the combination onto the intermediate layer.

2. The fiber optic cable of claim 1, wherein the plurality of optical fibers comprises a plurality of single-mode optical fibers.

3. The fiber optic cable of claim 1, wherein the plurality of optical fibers comprise a plurality of multi-mode optical fibers.

4. The fiber optic cable of claim 1, wherein an inner tube of the dual-layer core tube comprises a resin that prevents an oil of the thixotropic gel from contacting an outer tube of the dual-layer core tube.

5. The fiber optic cable of claim 1, wherein the plurality of linear elements are impregnated with a swellable polymer.

6. The fiber optic cable of claim 1, further comprising a plurality of swellable fibers that are aligned parallel to each other and adjacent the plurality of linear elements.

7. The fiber optic cable of claim 6, wherein the plurality of swellable fibers are located under the intermediate layer.

8. The fiber optic cable of claim 6, wherein the plurality of swellable fibers are located atop the intermediate layer.

9. The fiber optic cable of claim 1, wherein the plurality of linear elements comprise a plurality of aramid fibers.

10. The fiber optic cable of claim 1, wherein the plurality of linear elements comprise a plurality of oriented polymer fibers.

11. The fiber optic cable of claim 1, wherein the plurality of linear elements comprise fiberglass.

12. The fiber optic cable of claim 1, wherein the plurality of linear elements comprise a plurality of coated fiberglass yarns.

13. The fiber optic cable of claim 1, wherein the moisture-cure cross-linked material comprises moisture-cure high-density polyethylene.

14. The fiber optic cable of claim 1, wherein the outer layer further comprises a chemical animal repellant.

15. A method of assembling a fiber optic cable, comprising:
   providing a plurality of optical fibers and a thixotropic gel within a core tube, wherein:
      the core tube comprises a single-layer core tube or a dual-layer core tube,
      the thixotropic gel fills an interstitial space among the plurality of optical fibers within the core tube, and
      the thixotropic gel increases a hoop strength applicable to the core tube;
   contra-helically wrapping a plurality of linear elements about the core tube to provide a predetermined tensile strength to the fiber optic cable without overcoming the hoop strength of the core tube and to manage cable length recovery from a tensile condition of the fiber optic cable, wherein the plurality of linear elements form an intermediate layer surrounding the core tube; and
   masticating and extruding a combination of a moisture-cure cross-linked material and an activation catalyst onto the intermediate layer to form an outer layer that surrounds the intermediate layer.

16. The method of claim 15, wherein the combination further comprises an animal repellant.

17. The method of claim 16, wherein the combination further comprises at least one of low-density polyethylene pellets including the animal repellant or ethylene vinyl acetate pellets including the animal repellant.

18. The method of claim 15, further comprising curing the combination after extruding the combination onto the intermediate layer.

19. The method of claim 18, further comprising:
   applying a wax to the outer layer;
   winding the fiber optic cable into a circular bundle;
   reshaping the circular bundle into a noncircular bundle; and
   heating the noncircular bundle to reflow the wax.

20. A fiber optic cable comprising:
   a core tube surrounding a plurality of optical fibers;
   a thixotropic gel filling an interstitial space among the plurality of optical fibers within the core tube, wherein the thixotropic gel increases a hoop strength applicable to the core tube;
   an intermediate layer comprising a plurality of fibers braided about the core tube to provide a predetermined tensile strength to the fiber optic cable without overcoming the hoop strength of the core tube and to manage cable length recovery from a tensile condition of the fiber optic cable, wherein the plurality of fibers are impregnated with a swellable polymer;

a ripcord positioned atop the intermediate layer; and an outer layer surrounding the intermediate layer and the ripcord, wherein:

the outer layer comprises a moisture-cure cross-linked material, an activation catalyst, and a chemical animal repellant that are masticated and extruded onto the intermediate layer; and the ripcord facilitates removal of a portion of the outer layer from the intermediate layer.

* * * * *